United States Patent [19]

Wölber

[11] Patent Number: 4,752,833

[45] Date of Patent: Jun. 21, 1988

[54] CIRCUIT ARRANGEMENT FOR A VIDEO RECORDER

[75] Inventor: Jörg Wölber, Pinneberg, Fed. Rep. of Germany

[73] Assignee: U.S. Philips Corporation, New York, N.Y.

[21] Appl. No.: 871,186

[22] Filed: Jun. 5, 1986

[30] Foreign Application Priority Data

Jun. 7, 1985 [DE] Fed. Rep. of Germany ....... 3520321

[51] Int. Cl.$^4$ ............................................. H04N 9/80
[52] U.S. Cl. .................................... 358/320; 358/330
[58] Field of Search ............... 358/310, 326, 328, 329, 358/330

[56] References Cited

U.S. PATENT DOCUMENTS

| | | | |
|---|---|---|---|
| 4,208,674 | 6/1980 | Kuniyoshi et al. | |
| 4,405,937 | 9/1983 | Kudo et al. | 358/327 |
| 4,567,507 | 1/1986 | Kusakabe et al. | 358/310 |
| 4,573,086 | 2/1986 | Sakai et al. | 358/310 |

OTHER PUBLICATIONS

Service Manual for VHS Recorder VR 6460/00, 3-1-0-1985, & 11-12-1984.

Primary Examiner—Donald McElheny, Jr.
Attorney, Agent, or Firm—Thomas A. Briody; Algy Tamoshunas; Marianne R. Rich

[57] ABSTRACT

A circuit arrangement for a video recorder comprises a modulator (5) for modulating a chrominance signal from a first onto a second carrier wave by means of a third carrier wave. In order to generate the third carrier wave a first mixer (39) is coupled to a reference oscillator (18) and to a first voltage-controlled oscillator (23). A control signal from a phase-comparator circuit (15), which compares the frequency and phase of the burst signal with these of the first oscillator signal, and a control signal from a phase-comparator circuit (30) of a phase-locked loop in which a second voltage-controlled oscillator (27) is synchronized with the line synchronizing pulses, are applied to the first voltage-controlled oscillator (23). The two voltage-controlled oscillators are substantially identical and have a fixed frequency ratio with each other.

6 Claims, 1 Drawing Sheet

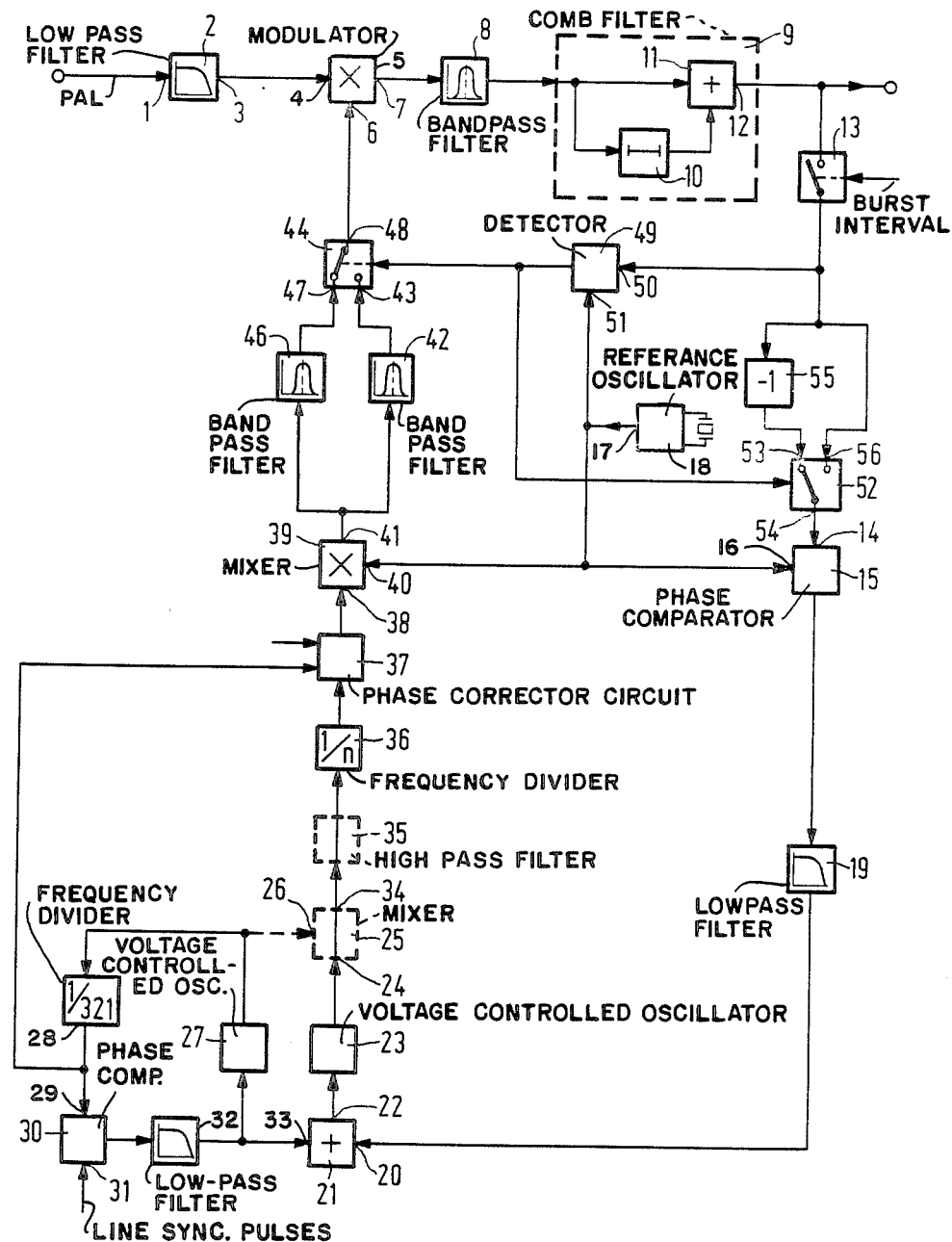

CIRCUIT ARRANGEMENT FOR A VIDEO RECORDER

BACKGROUND OF THE INVENTION

1. Field of the Invention

The invention relates to a circuit for a video recorder comprising a modulator for modulating a chrominance signal from a first onto a second carrier wave by means of a third carrier wave, a first phase-locked loop in which a first phase comparator circuit controls a first voltage-controlled oscillator in conformity with the phase comparison between the colour-burst signal, and an oscillator signal generated in a reference oscillator. The first voltage-controlled oscillator is coupled to the input of a first mixer for supplying the third carrier wave and is coupled to a second phase-locked loop comprising a second voltage-controlled oscillator and a second phase-comparator circuit for synchronising the frequency-divided oscillator signal generated by the second voltage-controlled oscillator with the reinserted line-synchronising pulses.

2. Prior Art

In recent video recorder systems, the band-limited luminance signal extracted from the composite colour signal is frequency-modulated and transposed to a higher frequency band of, for example, from 3 to 5 MHz during recording. The other signal component of the composite colour signal, the chrominance signal modulated from a chrominance carrier having a frequency of, for example, 4.43 MHz, onto a carrier of lower frequency, for example 627 kHz. During playback the chrominance signal is reconverted to the higher frequency band, which is effected by means of the above circuit arrangement which is known from the Service Manual of the Philips video recorder VR 6460. In said circuit arrangement this modulation is effected by means of a third carrier wave having a frequency of, for example 5.06 MHz, which in a first mixer is derived from the oscillator signals supplied by the first voltage-controlled (crystal) oscillator and the second voltage-controlled (RC) oscillator.

The oscillator signal generated by the second voltage-controlled oscillator is synchronised with the line synchronising pulses extracted from the luminance signal in the second phase-locked loop. The second phase-locked loop eliminates velocity variations of the heads, which give rise to frequency variations.

The frequency and phase of the first voltage-controlled oscillator are determined by the phase comparison between the first oscillator signal from a reference oscillator and the colour burst signal. Said first phase-locked loop should comprise a voltage-controlled crystal oscillator in order to avoid locking-in to a sideband of the burst frequency, which may happen with, for example, RC oscillators which have a larger tuning range. Such a sideband frequency is equal to the burst frequency of 4.43 MHz ±n.15,625 kHz, 15,625 kHz being the line frequency and n being an integer larger than or equal to 1. Since a crystal oscillator has a smaller tuning range, phase variations of the burst signal are eliminated slowly. Moreover, if this circuit arrangement is integrated, two external crystals must be connected because the first voltage-controlled oscillator and the reference oscillator are each controlled by a separate crystal.

SUMMARY OF THE INVENTION

It is the object of the invention to construct a circuit of the type set forth in the opening paragraph in such a way that it responds repaidly to phase variations and is obtained without locking-in to a sideband frequency of the burst. In accordance with the invention this object is achieved in that the frequencies of the two voltage-controlled oscillators are in a fixed ratio to each other. The control parameter of the first voltage-controlled oscillator is the sum of the output signals of the phase comparator circuits. The first voltage-controlled oscillator is coupled to the first mixer via a frequency divider and the reference oscillator is connected to the other input of the first mixer. The outputs of the two voltage-controlled oscillators are coupled to inputs of a second mixer arranged before the frequency divider.

In the circuit arrangement in accordance with the invention the oscillator signal from the second voltage-controlled oscillator is synchronised with the line frequency by a control signal from the second phase comparator circuit in the second phase-locked loop. The first voltage-controlled oscillator has a free-running frequency which as a result of component tolerances differs only slightly from that of the second voltage-controlled oscillator and is pulled towards the frequency of the second voltage-controlled oscillator by means of the control signal from the first phase comparator circuit. The first phase comparator circuit controls the frequency and phase of the first voltage-controlled oscillator in such a way that it is capable of eliminating phase variations between the burst signal and the first oscillator signal. As the first voltage-controlled oscillator is constructed as an RC oscillator it also has a larger tuning range. However, in order to ensure that it does not lock-in to a sideband frequency of the burst spectrum, the accuracy of the free-running frequency of the first voltage-controlled oscillator should be at least equal to the product of half the spacing between the two sideband frequencies and the divisor of the frequency divider, if the second voltage-controlled oscillator already operates at the correct frequency.

If components of the two voltage-controlled oscillators are integrated on a common semiconductor substrate, the component tolerances of the two voltage-controlled oscillators will exhibit a minimal spread relative to each other. This enables the two voltage-controlled oscillators to be adjusted jointly.

It is to be noted that from U.S. Pat. No. 4,208,674 a circuit is known which also comprises two oscillators with a fixed frequency relationship. Since in the circuit arrangement in accordance with the invention the outputs of the two voltage-controlled oscillators are coupled to inputs of a second mixer arranged before the frequency divider, the present arrangement will operate more reliable than the arrangement known from U.S. Pat. No. 4,208,674.

In addition this ensures that the differences between the free-running frequency of the first voltage-controlled oscillator and the frequency of the second voltage-controlled oscillator in the controlled condition may be larger whilst the arrangement operates correctly. This means that larger component tolerances are permissible in the manufacture of the circuit arrangement.

As the signal obtained by mixing the output signals of the two voltage-controlled oscillators comprise a low-frequency and a high-frequency signal component, a high-pass filter is arranged between the second mixer and the frequency divider in order to suppress the low-frequency mixing product.

When the chrominance signal is modulated from the first onto the second carrier a low-frequency and a high-frequency modulation product are formed. Therefore, a first band-pass filter is arranged behind the modulator in order to suppress the high-frequency modulation product.

In a further embodiment of the invention, in order to restore the original phase of the second carrier wave, a phase correction circuit is arranged between the frequency divider and the first mixer to cancel the phase shift of the first carrier introduced during recording and a comb filter is arranged behind the first band-pass filter in order to suppress cross-talk. During recording the chrominance signals of specific lines of a field are subjected to a constant phase shift. During playback this phase shift is cancelled, so that at the same time components caused by crosstalk from adjacent tracks are alsos phase-shifted. These crosstalk components are then suppressed in the comb filter.

In a PAL-standard television signal the chrominance carrier and hence the colour-burst signal are 90° phase-shifted every other line. During playback on a video recorder an incorrect switching phase may occur (for example when the picture is monitored during fast forward winding), i.e. the phase of the burst signal is not changed every other line. In order to correct for such an incorrect phase relationship the first mixer is coupled to the first input of a switching device via a second band-pass filter to suppress the low-frequency signal component and to the second input of said switching device via a third band-pass filter to suppress the signal component of higher frequency, the output signals of the band-pass filters are applied to the modulator as the third carrier wave via said switching device. A detector controls said switching device in response to the phase comparison between the oscillator signal from the reference oscillator and the burst signal, in order to obtain the correct switching phase of the second carrier wave, and one of the signals applied to the first phase comparator circuit is inverted if the output signal of the third band-pass filter is applied to the modulator.

DESCRIPTION OF THE FIGURES

An embodiment of the invention will now be described in more detail, by way of example, with reference to the accompanying drawings in which FIG. 1 represents the embodiment.

BRIEF DESCRIPTION OF THE PREFERRED EMBODIMENT

A PAL-encoded video signal reproduced via the video heads is supplied at the input 1 of a low-pass filter 2 having a cut-off frequency of 1.1 MHz. A chrominance signal, from which the luminance signal has been removed, is applied to the output 3 of the low-pass filter 2. The output 3 of the low-pass filter 2 is connected to an input 4 of a modulator 5. In the modulator 5 the chrominance signal is modulated from a first carrier having a frequency of 627 kHz onto a second carrier wave having a frequency of 4.43 MHz. For this conversion a third carrier wave is applied to a second input 6 of the modulator 5. The modulation product appearing on the output 7 of the modulator 5 comprises the chrominance signal on the 4.43 MHz carrier frequency and a signal component of a higher frequency, which is suppressed by a following band-pass filter 8 having a centre frequency of 4.43 MHz. The band-pass filter 8 is followed by a comb filter 9 which comprises a delay stage 10 and an adder 11. The input signal of the comb filter 9 is applied to the adder 11 directly and via a delay stage which delays the signal by two line intervals. In the comb filter 9 crosstalk is suppressed in a manner as described in DE-AS No. 26 46 806 and a modulated chrominance signal which is free from crosstalk is available on the output 12 of the comb filter 9.

The output 12 of the comb filter 9, which also constitutes the output of the adder 11, is connected to a switch 13. The switch 13 is closed during the burst-gating interval, i.e. during the interval in which the burst signal appears. The output of the switch 13 is connected to an inverter 55 and to the first input 56 of a switching device 52. The output signal of the inverter 55 is applied to the second input 53 of the switching device 52. The output 54 of the switching device 52 is connected to the input 14 of a first phase-comparator circuit 15. Further, a switching signal is applied to the switching device 54. An oscillator signal is applied from the output 17 of a reference oscillator 18 to another input 16 of the first phase comparator circuit 15. The reference oscillator 18 generates a quartz-stabilized oscillator signal of a frequency of 4.43 MHz. The phase comparator circuit 15 stores the control signal and supplies a constant control signal during the time in which no burst signal appears.

By means of a low-pass filter 19, which suppresses signal components of higher frequency, the output signal of the first phase comparator circuit 15 is applied to a first input 20 of an adder 21. The output 22 of the adder 21 is connected to a first voltage-controlled oscillator 23. The oscillator 23 is constructed as an RC oscillator and generates an oscillator signal with a free-running frequency of approximately 5.016 MHz, which is applied to a frequency divider 36. The frequency divider 36 has a dividing factor of 8.

A second voltage-controlled RC oscillator 27 generates an oscillator signal having a free-running frequency of approximately 5.106 MHz. Via a frequency divider 28 the oscillator signal is applied to a first input 29 of a second phase-comparator circuit 30. The frequency divider 28 has a dividing factor of 321, i.e. it divides the frequency of the oscillator signal from the oscillator 27 by 321. The line-synchronizing pulses separated from the reproduced video signal are applied to a second input 31 of the phase-comparator circuit 30 and in this phase-comparator circuit their frequency and phase are compared with the frequency-divided oscillator signal from the oscillator 27. The output signal of the phase-comparator circuit 30 is applied, via a low-pass filter, to an input 33 of the adder 21 and to the second voltage-controlled oscillator 27.

The output signal of the frequency divider 36 is applied to a phase-correction circuit 37. The phase-correction circuit 37 also receives the line-frequency output signal from the frequency divider 38 and the head-identification pulses. The head-identification pulses indicate the change-over between the video heads. The phase-correction circuit 37 is described in more detail in, for example, DE-AS No. 26 46 806. In this circuit the phase of the output signal of the frequency divider 36 is changed by a constant amount during one line interval. For example, in one field the phase is shifted through 90° every other line, so that during every fourth line the same phase relationship is obtained and in the next field the phase is not changed.

The frequency-divided and partly phase-shifted output signal from the phase-correction circuit 37, which signal has a frequency of 627 kHz, is applied to a first input 38 of a mixer 39. The second input 40 of the mixer 39 is connected to the output 17 of the reference oscillator 18. A mixed signal comprising the two frequency components of 5.06 MHz and 3.8 MHz appears on the output 41 of the mixer 39. Through a band-pass filter 42, which suppresses the low-frequency signal component, the mixed signal is applied to a first input 43 of a switching device 44. Through a band-pass filter 46 which extracts the higher frequency signal component from the mixed signal, the signal is applied to a second input 47 of the switching device 44. The output 48 of the switching device 44 is connected to the point 6 of the modulator 5. In the switching device 44 either the input 43 or the input 47 is connected to the output 48. The switching device 44 is controlled by a detector 49. The output signal of the comb filter is applied to the first input 50 via the switch 13 and the first oscillator signal from the reference oscillator 18 is applied to a second input 51. Moreover, the detector 49 generates the switching signal for the switching device 52.

The operation of the circuits 42, 44, 46, 49, 52 and 55 is described comprehensively in German Patent Specification No. 24 33 330. If the switching phase of the chrominance carrier and hence that of the burst signal in the video signal is incorrect, i.e. if the burst signal does not exhibit a 90° phase shift every other line, this is detected by the detector 49, causing the switching device 44 and a switching device 52 to be changed over. If the output 48 of the switching device 44 is connected to the input 47, there is also a connection between the output 54 of the switching device 52 and the input 53. This switch position is maintained until the detector 49 detects the next incorrect switching phase. The two switching devices 44 and 52 are then reset. In the modulator 5 the 4.43-MHz chrominance carrier signal is generated from the two output signals of the band-pass filters 42 or 46 with the correct switching phase of the chrominance carrier. Alternatively, the first oscillator signal may be applied from the reference oscillator 18 to the phase-comparator circuit 15 via the circuit comprising the inverter 52 and the switching device 55. The output of the switch 13 is then connected directly to the input 14 of the phase-comparator circuit.

The operation of the circuit arrangement will now be described. The second voltage-controlled oscillator 27 is controlled to operate exactly at 321 times the line frequency. The first voltage-controlled oscillator 23 operates at a frequency which deviates only slightly from that of the voltage-controlled oscillator 27 as a result of the minimal spread in component tolerances. The control voltage from the phase-comparator circuit 30 pulls the first voltage-controlled oscillator 23 towards the frequency of the second voltage-controlled oscillator 27. The frequency and phase of the first voltage-controlled oscillator 23 is in fact determined by a control signal from the first phase-comparator circuit 15, which during the burst keying interval compares the frequency and phase of the first oscillator signal with that of the burst signal and maintains the voltage constant during the remaining lines. After frequency division in the frequency divider 36 and, if necessary, a phase correction in the phase-correction circuit 37, the 627-kHz signal is derived from the output signal of the voltage-controlled oscillator 23.

The chrominance signal comprising the burst signal and a modulated colour signal appears on the output 12 of the comb filter 9. The chrominance carrier exhibits side bands which are spaced at 7.8 kHz, which is determined by the line frequency and the phase alternation of the chrominance carrier. When the circuit arrangement is integrated the free-running frequencies of the two voltage-controlled oscillators 23 and 27 deviate only slightly from each other as a result of component tolerances. In order to avoid locking-in to a sideband, the frequency of the first voltage-controlled oscillator 23 should deviate only to a specific extent from the nominal frequency. The frequency divider 36 not only divides the frequency of the output signal of the oscillator 23 but it also makes a larger deviation from the nominal frequency permissible. Locking-in to said sideband is impossible only if the frequency deviation after the frequency divider 36 is only a quarter of the line frequency ($\pm 3.9$ kHz). Thus, the permissible frequency deviation of the oscillator 23 in the case of a dividing factor of 8 of the frequency divider 36 is twice the line frequency ($\pm 31.2$ kHz). In practice, it is found that the oscillators 23 and 27 can be constructed in such a way that the difference between their free-running frequencies does not exceed this value.

Since the two voltage-controlled oscillators 23 and 27 operate at substantially the same frequency and are both integrated on a common semiconductor substrate, only one adjustment is needed for the two oscillators 23 and 27.

A further step allows the permissible frequency deviation of the oscillator 23 to be increased by a factor of 2. For this purpose a second mixer 25 and a high-pass filter 35 are arranged between the oscillator 23 and the frequency divider 36. The output signal of the oscillator 23 is applied to a first input 24 of the mixer 25 and the output signal of the oscillator 27 is not only applied to the frequency divider 28 but also to a second input 26 of the mixer 25. The mixing product on the output 34 of the second mixer 25 comprises a high-frequency signal component of approximately 10,032 MHz and a low-frequency signal component which is suppressed in the high-pass filter 35. The output signal of the high-pass filter 35 is applied to the frequency divider 36, whose divisor is 16. As the second voltage-controlled oscillator 27 operates at exactly a multiple of the line frequency and the frequency divider 36 receives a signal of a frequency which is doubled in comparison with that in the above embodiment, the permissible frequency deviation of the oscillator 23 is also doubled.

Another function of the phase-locked loop comprising the voltage-controlled oscillator 27, the frequency divider 28, the phase-comparator circuit 30 and the low-pass filter 32 is to eliminate speed variations which manifest themselves as frequency variations. The frequency variations appear both in the colour-burst signal and in the line synchronising pulse, so that they cancel each other during mixing.

During recording the phase of the 627-kHz carrier wave is partly shifted by a constant amount in one line interval. The phase-correction circuit 37 changes the phase of the mixing product received from the mixer 25 in such a way that during modulation the phase variation of the carrier wave is eliminated again. As during playback there is also chrominance crosstalk from adjacent tracks, the phase of these crosstalk components is also changed, so that these components are ultimately suppressed in the comb filter 9.

What is claimed is:

1. A circuit for processing a chrominance signal in a video recorder comprising:
   a modulator for modulating a chrominance signal onto a carrier wave;
   a circuit for generating said carrier wave comprising:
      a first phase locked loop comprising a first phase comparator having a first input connected to receive a burst component of said chrominance signal from said modulator, a reference oscillator connected to a second input of said phase comparator, and a first voltage controlled oscillator connected to receive an error voltage from said comparator;
      a second phase locked loop comprising a second phase detector having a first input connected to a line synchronizing signal, a second voltage controlled oscillator having a nominal operating frequency which is in a fixed ratio with said first oscillator, connected through a frequency divider to a second input of said second phase detector, said phase detector providing a second control voltage to said second voltage controlled oscillator;
   means for combining said second control voltage with said first control voltage whereby said first voltage controlled oscillator receives a combined error voltage; and
   a mixer for receiving a signal from said first voltage controlled oscillator through a second frequency divider, and a signal from said reference oscillator producing at an output said carrier wave.

2. A circuit arrangement as claimed in claim 1, wherein components of the two voltage-controlled oscillators are integrated on a common semiconductor substrate.

3. A circuit according to claim 1, further comprising a high-pass filter for suppressing a low-frequency mixing product connected between the mixer and said frequency divider.

4. A circuit as claimed in claim 3, comprising a first bandpass filter for suppressing a high-frequency modulation product produced by said modulator.

5. A circuit as claimed in claim 4, including a phase-correction circuit between the second frequency divider and the mixer to cancel a phase shift to which a previous carrier wave modulated with said chrominance has been subjected during recording, and a comb filter for suppressing crosstalk connected to the output of the first band-pass filter.

6. The circuit of claim 1 further comprising:
   a switching means connected between said mixer and said modulator, said switching means providing first and second alternative signal paths for said carrier wave, said first signal path including a first bandpass filter, and said second signal path providing a second bandpass filter, said first bandpass filter suppressing a low frequency component in said carrier wave, and said second bandpass filter suppressing a high frequency component in said carrier wave; and,
   detector means connected to said switching means and to said first phase detector for selecting one of said switching paths in response to the relative phase between said color burst and reference oscillator signal.

* * * * *